United States Patent
Petershans et al.

(10) Patent No.: US 11,958,771 B1
(45) Date of Patent: Apr. 16, 2024

(54) GLASS, GLASS ARTICLE, METHOD OF MAKING THE GLASS, USE OF THE GLASS AND FLASH LAMP COMPRISING THE GLASS

(71) Applicant: Schott AG, Mainz (DE)

(72) Inventors: Andre Petershans, Nabburg (DE); Carina Bronnbauer, Eichigt (DE); Sebastian Heinl, Mantel (DE); Hans Lippert, Wiesau (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 17/968,486

(22) Filed: Oct. 18, 2022

(30) Foreign Application Priority Data

Oct. 19, 2021 (EP) .................................. 21203356

(51) Int. Cl.
*H01J 61/30* (2006.01)
*C03C 3/06* (2006.01)
*C03C 3/091* (2006.01)

(52) U.S. Cl.
CPC ............... *C03C 3/091* (2013.01); *C03C 3/06* (2013.01); *H01J 61/302* (2013.01)

(58) Field of Classification Search
CPC .......... C03C 3/091; C03C 3/06; H01J 61/302
See application file for complete search history.

(56) References Cited

U.S. PATENT DOCUMENTS

| | | | |
|---|---|---|---|
| 4,665,039 A | 5/1987 | Kokubu et al. | |
| 5,459,110 A | 10/1995 | Brix | |
| 5,736,476 A | 4/1998 | Watzke et al. | |
| 5,763,343 A | 6/1998 | Brix et al. | |
| 5,979,187 A | 11/1999 | Churchley et al. | |
| 2009/0023575 A1 | 1/2009 | Fujita et al. | |
| 2013/0225389 A1 | 8/2013 | Dick et al. | |
| 2020/0317559 A1 | 10/2020 | Fan et al. | |
| 2022/0177352 A1 | 6/2022 | Petershans et al. | |
| 2022/0371941 A1* | 11/2022 | Kii | C03C 3/091 |

FOREIGN PATENT DOCUMENTS

| | | |
|---|---|---|
| DE | 10 2005 000 663 A1 | 11/2006 |
| EP | 3 613 712 A1 | 2/2020 |
| JP | 08-239237 A | 9/1996 |
| WO | 2007/119705 A1 | 10/2007 |

OTHER PUBLICATIONS

European Communication dated Apr. 11, 2022 for European Patent Application No. 21 203 356.7 (5 pages).
"The solubility of H2O vapor in glass melts of various bases", "Glastechnische Berichte", H. Frank and H. Scholze, Glastechnical Reports, Journal for Glass Science, vol. 36, issue 9, p. 350, Sep. 1963 (12 pages).

* cited by examiner

*Primary Examiner* — Anne M Hines
(74) *Attorney, Agent, or Firm* — Taylor IP, P.C.

(57) ABSTRACT

A glass has a coefficient of thermal expansion in a temperature range from 20° C. to 300° C. of 4.5 ppm/K or less, and a T4 temperature, defined as the temperature at which the glass has a viscosity of $10^4$ dPa*s, at 1500° C. or more, and having a reboil propensity score of less than 10 measured in a reboil propensity test. The reboil propensity score is determined as a number of bubbles per glass rod formed from the glass after the reboil propensity test.

17 Claims, 4 Drawing Sheets

GLASS, GLASS ARTICLE, METHOD OF MAKING THE GLASS, USE OF THE GLASS AND FLASH LAMP COMPRISING THE GLASS

CROSS REFERENCE TO RELATED APPLICATIONS

This application claims priority to European Patent Application No. EP 21203356.7 filed on Oct. 19, 2021, which is incorporated in its entirety herein by reference.

BACKGROUND OF THE INVENTION

1. Field of the Invention

The present invention relates to glass, glass articles, methods of making the glass, use of the glass and flash lamps comprising the glass. The glass provided according to the invention is particularly suitable for flash lamps comprising the glass.

2. Description of the Related Art

Flash lamps find a variety of uses in medical, industrial, and scientific applications.

Flash lamps are typically built from a fused silica/quartz or borosilicate tube which is designed as a U-shape, wherein the two ends are integrated with metal electrodes. High-voltage electrical power is supplied via conductive supports which also function as a mount or lamp holder during operation.

Special glasses have been developed to connect the metal conductive supports of the metal electrodes to the tube wall of flash lamps, particularly to account for the different thermal coefficients of expansion of the metal and the glass forming the tube, in view of the large temperature changes during use.

Typically, the electrodes are constructed from tungsten or molybdenum and an intermediate sleeve of a glass with a suitable thermal coefficient of expansion, e.g. a so-called graded seal glass, being formed around the metal base before it is introduced into and sealed to an end of the lamp tube.

EP 3 613 712 A1 discloses a lamp body comprising a tubular element made of a glass or a glass-ceramic material, a conductor introduced into the tubular element, and a glass material surrounding the conductor and connecting it to the tubular element. The glass material forms a hermetic seal between the tubular element and the conductor and comprises a sintered glass which completely surrounds the conductor after being fused on the tubular element.

U.S. Pat. No. 5,979,187 A discloses a method of forming a glass to metal seal between one end of a glass lamp tube for a flash lamp. In the method of U.S. Pat. No. 5,979,187 A, a metal rod, which is terminated by the electrode, is heated, and a molten glass sealing material is applied to form a beaded sleeve. The tube to which the electrode is to be attached is heated, and further sealing material is applied to the end of the tube to create a dome of material which closes off that end. Excess sealing material is then removed from the dome so as to leave an annulus of sealing material around the end wall of the (open) tube. The electrode and rod can then be inserted into the tube until the bead on the rod is near the annulus at the end of the tube, and the tube can be worked down (by rotation) to form a conical end such that movement of the bead relative to the annulus then brings the two into contact while a positive gas pressure is maintained within the tube. The pressure between the inside and outside of the tube is balanced while the tube is worked down onto the bead to cause the bead in the annulus to become completely fused. The tube is then pressurized so that the sealing material conforms to a smooth internal concave shape.

A problem associated with flash lamps and their manufacture is that the fuse between the electrode and the glass tube is not stable due to extreme and rapid temperature changes. This affects the stability and lowers the lifespan of the manufactured flash lamps undergoing extreme and rapid temperature changes during their lifecycle.

What is needed in the art is a way to solve the problems associated with flash lamps and the manufacturing of flash lamps.

SUMMARY OF THE INVENTION

In some embodiments provided according to the invention, a glass has a coefficient of thermal expansion in the temperature range from 20° C. to 300° C. of 4.5 ppm/K or less, and a T4 temperature, defined as the temperature at which the glass has a viscosity of 104 dPa*s, at 1500° C. or more, and having a reboil propensity score of less than 10 measured in a reboil propensity test.

In some embodiments provided according to the invention, a glass has a coefficient of thermal expansion in the temperature range from 20° C. to 300° C. of 4.5 ppm/K or less, and a T4 temperature, defined as the temperature at which the glass has a viscosity of 104 dPa*s, at 1500° C. or more, the glass having a water content of at least 35 mmol/l, optionally at least 45 mmol/l, optionally at least 55 mmol/l.

In some embodiments provided according to the invention, a glass article includes or consists of a glass provided according to the invention, being in the shape of a rod, a tube, an ingot, a disc, a sheet or a block.

In some embodiments provided according to the invention, a method of making a glass includes: preparing a glass melt of glass raw materials; adjusting a water content of the glass melt; and cooling and/or forming the glass melt to obtain a glass article. The glass has a coefficient of thermal expansion in the temperature range from 20° C. to 300° C. of 4.5 ppm/K or less, and a T4 temperature, defined as the temperature at which the glass has a viscosity of 104 dPa*s, at 1500° C. or more, the glass having a water content of at least 35 mmol/l, optionally at least 45 mmol/l, optionally at least 55 mmol/l, and/or the glass has a reboil propensity score of less than 10 measured in a reboil propensity test.

In some embodiments provided according to the invention, a use of a glass provided according to the invention is provided for joining a metal article to a glass element.

In some embodiments provided according to the invention, a flash lamp includes a glass provided according to the invention.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Shelby ("Introduction to Glass Science and Technology", 2nd edition, 2005, pages 40 to 42) gives an account of sources of bubbles which may be formed by physical trapping of atmospheric gases during the initial phase of batch melting, or by the decomposition of batch components. Decomposition of batch materials can produce extremely large quantities of gases, such as $CO_2$, $SO_3$, $NO_x$, $H_2O$, etc. Bubbles can also be formed by precipitation from the melt whenever supersaturation occurs for a specific gas. Species which alter their chemical form with temperature or changes in melt composition are particularly susceptible to precipitation from melts where they were previously soluble. Reboil, or the formation of bubbles in previously bubble-free glasses, is a special case of said precipitation phenomena. Reboil specifically refers to bubble formation from bubble-free materials during reheating of glasses from the solid state, or during increases in melt temperature.

Hujová & Vernerová (Ceramics-Silikáty 61 (3), 202-208, 2017) reviewed the influence of fining agents on glass melting (A Review, Part 2) and addressed different ways of bubble nucleation which are termed "reboil" in the glass technology. Specifically, the industry distinguishes various reboil phenomena according to their origin, i.e., compositional reboil, thermal reboil, chemical reboil, electrochemical reboil, radiative reboil and mechanical reboil. For example, thermal reboil is the consequence of temperature change, leading to decrease of gas solubility in the melt due to temperature increase. Particularly, the reboil of glass occurs in a previously bubble free glass that becomes supersaturated by a particular gas. The supersaturation of the melt may cause severe defects in the final glass. Such a phenomenon occurs mostly during the temperature rise of the melt (temperature reboil), which was already saturated at lower temperatures with a gas having the negative temperature coefficient of solubility. Hujová & Vernerová also confirm that composition of nucleated bubbles varies on their type and origin, e.g., bubbles coming from the boundaries between the melt and the refractory materials are the consequence of decreasing melt basicity ($CO_2$, $H_2O$ bubbles, fining gas bubbles). Hujová & Vernerová underline that a change of temperature is a driver for bubble nucleation (thermal reboil). Temperature as the driver for bubble nucleation is beneficial and intended during the proper melting and fining process but damaging for an already molten and refined glass.

Embodiments of glasses provided according to this disclosure are characterized by a T4 temperature, defined as the temperature at which the glass has a viscosity of $10^4$ dPa*s, of 1500° C. or more, and are used as a sealing glass for flash lamps which undergo repeated and extreme temperature changes. Therefore, the thermal reboil phenomenon becomes important and may lead to, e.g., $CO_2$ and $H_2O$ bubbles upon (repeated) heating cycles with strong temperature differences in the absence of appropriate countermeasures.

Reboil Propensity Test

In some embodiments the invention relates to a glass having a coefficient of thermal expansion in the temperature range from 20° C. to 300° C. of 4.5 ppm/K or less, and a T4 temperature, defined as the temperature at which the glass has a viscosity of $10^4$ dPa*s, at 1500° C. or more, and having a reboil propensity score of less than 10 measured in a reboil propensity test.

It has been surprisingly found that a glass having a coefficient of thermal expansion in the temperature range from 20° C. to 300° C. of 4.5 ppm/K or less, and a T4 temperature, defined as the temperature at which the glass has a viscosity of $10^4$ dPa*s, at 1500° C. or more, and having a reboil propensity score of less than 10 measured in a reboil propensity test, improves the fuse between an electrode and a glass tube, such as e.g. a tungsten electrode and a quartz glass tube. It has thereby been established that a glass provided according to the invention improves the stability and increases the lifespan of the manufactured flash lamps which are known to undergo extreme and rapid temperature changes during their lifecycle. In this respect, it has also been found that a glass or a glass composition provided according to the invention benefits and/or improves the manufacturing of flash lamps.

In some embodiments the glass has a coefficient of thermal expansion, measured according to DIN ISO 7991:1987 in the temperature range of 20° C. to 300° C., of 4.5 ppm/K or less, 4.0 ppm/K or less, 3.5 ppm/K or less, or 3.0 ppm/K or less. In some embodiments the glass has a coefficient of thermal expansion, measured according to DIN ISO 7991:1987 in the temperature range of 20° C. to 300° C., of 0.4 ppm/K or more, 0.5 ppm/K or more, 0.6 ppm/K or more, 0.7 ppm/K or more, or 0.8 ppm/K or more. In some embodiments the glass has a coefficient of thermal expansion of 0.4 ppm/K to 4.5 ppm/K, 0.5 ppm/K to 4.0 ppm/K, 0.6 ppm/K to 3.5 ppm/K, or 0.7 ppm/K to 3.0 ppm/K.

The coefficient of thermal expansion is optionally chosen in such a way to compensate for the difference between the coefficient of thermal expansion of e.g. quartz glass and a used metal. For example, in the manufacture of flash lamps it may be advantageous if the glass has a coefficient of thermal expansion which lies between the coefficient of thermal expansion of e.g. quartz glass and an electrode metal, such as tungsten or molybdenum.

In some embodiments the glass has a T4 temperature, defined as the temperature at which the glass has a viscosity of $10^4$ dPa*s, of 1500° C. or more, 1550° C. or more, 1600° C. or more, or 1650° C. or more. In some embodiments the glass has a T4 temperature, defined as the temperature at which the glass has a viscosity of $10^4$ dPa*s, of 1900° C. or less, 1850° C. or less, 1800° C. or less, or 1750° C. or less. In some embodiments the glass has a T4 temperature, defined as the temperature at which the glass has a viscosity of $10^4$ dPa*s, of 1500° C. to 1900° C., 1550° C. to 1850° C., 1600° C. to 1800° C., or 1650° C. to 1750° C. The T4 temperature may be determined according to ISO 7884-3: 1998-02.

T4 temperature depends on the glass composition (cf. the glass compositions in the Examples section). For example, a high amount of alkali metal oxides, such as e.g. $Na_2O$ and $K_2O$, or alkali earth metal oxides will lower the T4 temperature of the glass composition, whereas increasing amounts of $SiO_2$ or $Al_2O_3$ will raise T4. For example, by adjusting the amount of alkali metal oxides temperature dependence of glass viscosity can be influenced, e.g. limiting the amount of one or more alkali metal oxides, in percent by weight, below 4.0% may contribute to obtaining a T4 temperature of 1500° C. or more.

Shelby ("Introduction to Glass Science and Technology", 2nd edition, 2005, pages 124 to 131) proves that a high $SiO_2$ content provides for a glass with a high melting point, whereas the addition or presence of substantial amounts of alkali metal oxides and/or earth alkali metal oxides lowers the glass melting point far below a T4-value of 1500° C.

A suitably high T4 temperature may benefit the fusion of the quartz tube to the metal electrode when used as a sealing glass for the production of e.g. flash lamps.

The reboil propensity test comprises the following steps:
a.) providing a glass rod consisting of the glass, wherein the glass rod has a length of 200 to 1000 mm, such as e.g. about 500 mm, and wherein the glass rod has a circular diameter, e.g. a circular diameter of between 2.5 and 5 mm, such as about 3 mm;
b.) providing a burner, such as e.g. the burner model Zenit 114/2 ESL;
c.) heating the glass rod by the burner to a critical temperature range having a lower critical temperature and an upper critical temperature, wherein the lower critical temperature is 200° C. above the softening point of the glass and wherein the upper critical temperature is below the T4 temperature, optionally the critical temperature range is between 1400 and 1700° C., wherein optionally at least half the glass rod is heated to the critical temperature range;
d.) forming the glass rod into a spiral, such that all layers of the spiral are fused to each other;
e.) optionally maintaining the formed spiral at the critical temperature range during the entire forming step;
f.) cooling the formed spiral to room temperature by compressed air; and
g.) establishing a reboil propensity score, wherein the reboil propensity score is determined as number of bubbles per glass rod, wherein bubbles are optionally defined according to DIN EN 1595:1997-05.

In some embodiments, step c.) comprises heating the glass rod by the burner to a critical temperature range, wherein the lower critical temperature is 200° C. above the softening point of the glass and wherein the upper critical temperature is below the T4 temperature, optionally the critical temperature range is between 1400 and 1700° C., wherein a glass rod of 800 mm length and 3 mm circular diameter is heated to the critical temperature range to at least 400 mm of its length.

In some embodiments, step c.) comprises heating the glass rod by the burner to a critical temperature range, wherein the lower critical temperature is 200° C. above the softening point of the glass and wherein the upper critical temperature is below the T4 temperature, optionally the critical temperature range is between 1400 and 1700° C., wherein a glass rod of 800 mm length and 5 mm circular diameter is heated to the critical temperature range to at least 200 mm, optionally 250 mm, of its length.

In some embodiments, step c.) comprises heating the glass rod by the burner to a critical temperature range, wherein the lower critical temperature is 200° C. above the softening point of the glass and wherein the upper critical temperature is below the T4 temperature, optionally the critical temperature range is between 1400 and 1700° C., such that a melting tear or melting drop of at least 20 mm, optionally at least 30 mm, tear diameter or drop diameter is generated.

In some embodiments, step g.) comprises establishing a reboil propensity score, wherein the reboil propensity score is determined as number of bubbles per glass rod, wherein bubbles are defined according to DIN EN 1595:1997-05, wherein the reboil propensity score is less than 10 bubbles per 125 $mm^3$ in any part of the formed spiral, less than 6 bubbles per 125 $mm^3$ in any part of the formed spiral, less than 3 bubbles per 125 $mm^3$ in any part of the formed spiral, less than 2 bubbles per 125 $mm^3$ in any part of the formed spiral, or less than 1 bubble per 125 $mm^3$ in any part of the formed spiral.

For the assessment and/or quantification of step g.) any bubbles that appear at the interface of the layers of the spiral are to be ignored.

In some embodiments, step g.) comprises establishing a reboil propensity score, wherein the reboil propensity score is determined as the average number of bubbles per glass rod, wherein bubbles are defined according to DIN EN 1595:1997-05, wherein the average reboil propensity score is less than 10 bubbles per 125 mm3, less than 6 bubbles per 125 mm3, less than 3 bubbles per 125 mm3, less than 2 bubbles per 125 mm3, or less than 1 bubble per 125 mm3.

In some embodiments, step g.) comprises establishing a reboil propensity score, wherein the reboil propensity score is determined as number of bubbles per glass rod, wherein the bubbles have an equivalent spherical diameter of at least 0.5 mm and an equivalent spherical diameter of less than 2.0 mm, wherein the reboil propensity score is less than 10 bubbles per 125 mm3 in any part of the formed spiral, less than 6 bubbles per 125 mm3 in any part of the formed spiral, less than 3 bubbles per 125 mm3 in any part of the formed spiral, less than 2 bubbles per 125 mm3 in any part of the formed spiral, or less than 1 bubble per 125 mm3 in any part of the formed spiral.

In some embodiments, step g.) comprises establishing a reboil propensity score, wherein the reboil propensity score is determined as the average number of bubbles per glass rod, wherein the bubbles have an equivalent spherical diameter of at least 0.5 mm and an equivalent spherical diameter of less than 2.0 mm, wherein the average reboil propensity score is less than 10 bubbles per 125 mm3, less than 6 bubbles per 125 mm3, less than 3 bubbles per 125 mm3, less than 2 bubbles per 125 mm3, or less than 1 bubble per 125 mm3.

The quality and stability of the seal in a flash lamp, i.e. the fuse between the electrode and the quartz glass, may be hampered and or adversely affected in case the reboil propensity test is not passed.

The reboil propensity test is carried out on a glass rod (specimen) consisting of the glass provided according to the invention. The glass rod may be described by a length and a width, assuming a cylinder shape. Whereas the length of the glass rod is not very critical for the test, the glass rod has a length of typically about 500 mm. Based on a cylinder shape, the glass rod has a circular diameter, e.g. a circular diameter of about 3 mm works well for the test. The skilled person knows the metes and bounds of both the length and the circular diameter of the glass rod in order to successfully perform the underlying reboil propensity test.

Likewise, the skilled person is able to choose and provide a suitable burner, and knows how to establish the heating of the glass rod by the burner to a critical temperature range having a lower critical temperature and an upper critical temperature. As part of the test, the lower critical temperature is 200° C. above the softening point of the glass and the upper critical temperature is below the T4 temperature. The critical temperature range may be between 1400 and 1700° C., and at least half the glass rod may be heated to the critical temperature range.

Figure 1:
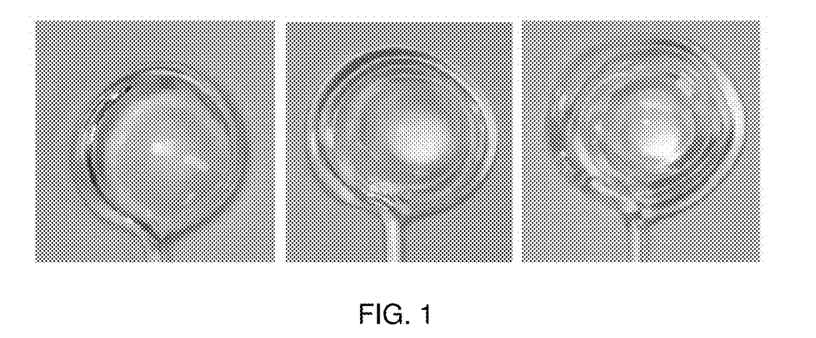
FIG. 1 illustrates formed spirals in a reboil propensity test, obtained at temperatures of 1650° C., 1580° C. and 1420° C. (from left to right)

After the critical temperature range has been established (for at least half the glass rod) the glass rod is formed into a spiral, such that all layers of the spiral are fused to each other. All layers of the spiral lie essentially within a plane (FIG. 1). The skilled person will appreciate that the temperatures and dimensions of the specimen are chosen such that the glass can be formed into a spiral, i.e. the viscosity is low enough to give the glass the desired shape, however not too low in order to avoid that the glass deforms or sags uncontrolledly. Optionally the formed spiral is maintained at or within the critical temperature range during the entire forming step. Subsequently, the formed spiral is cooled to room temperature by compressed air. The skilled artisan knows and understands that the cooling rate is important for the test, and that too high a cooling rate may confound the reboil propensity test and the obtained test result.

In some embodiments the glass has a reboil propensity score measured in a reboil propensity test on a glass rod, wherein the reboil propensity score is less than 10. The reboil propensity score is equivalent to the number of bubbles observed per glass rod after the test, wherein bubbles are optionally defined according to DIN EN 1595: 1997-05. Optionally, the reboil propensity score is less than 6 or less than 3. The reboil propensity score may be calculated as the average of a reboil propensity test carried out on a total of 3, 6, 9 or 12 specimen.

In some embodiments the glass has a coefficient of thermal expansion in the temperature range from 20° C. to 300° C. of 0.4 ppm/K to 4.5 ppm/K, 0.5 ppm/K to 4.0 ppm/K, 0.6 ppm/K to 3.5 ppm/K, or 0.7 ppm/K to 3.0 ppm/K, and a T4 temperature, defined as the temperature at which the glass has a viscosity of 104 dPa*s, at 1500° C. or more, and having a reboil propensity score of less than 3 measured in a reboil propensity test.

In some embodiments the glass has a coefficient of thermal expansion in the temperature range from 20° C. to 300° C. of 0.4 ppm/K to 4.5 ppm/K, and a T4 temperature, defined as the temperature at which the glass has a viscosity of 104 dPa*s, of 1500° C. to 1900° C., 1550° C. to 1850° C., 1600° C. to 1800° C., or 1650° C. to 1750° C., and having a reboil propensity score of less than 10 measured in a reboil propensity test.

In some embodiments, the glass has a water content of at least 35 mmol/l, at least 40 mmol/l, at least 45 mmol/l, at least 50 mmol/l, or at least 55 mmol/l. In some embodiments, the glass has a water content of 250 mmol/l or less, 200 mmol/l or less, 150 mmol/l or less, 125 mmol/l or less, or 100 mmol/l or less. Accordingly, in some embodiments, the glass has a water content of 35 to 250 mmol/l, 40 to 200 mmol/l, 45 to 150 mmol/l, 50 to 125 mmol/l, or 55 to 100 mmol/l.

Without being bound to any theory, it has been found that a water content of at least 35 mmol/l, at least 40 mmol/l, at least 45 mmol/l, at least 50 mmol/l, or at least 55 mmol/l, may help to reduce the reboil tendency of a glass upon repeated and multiple (re)heating and/or manufacturing of the glass.

Glass Composition

In some embodiments the glass comprises $SiO_2$ in an amount of 70.0% by weight or more, 72.0% by weight or more, 74.0% by weight or more, 76.0% by weight or more, 78.0% by weight or more, or 80.0% by weight or more. In some embodiments the glass comprises $SiO_2$ in an amount of 90.0% by weight or less, 89.0% by weight or less, 88.0% by weight or less, 87.0% by weight or less, or 86.0% by weight or less. In some embodiments the glass comprises $SiO_2$ in an amount of 70.0% to 90.0% by weight, 72.0% to 89.0% by weight, 74.0% to 88.0% by weight, 76.0% to 87.0% by weight, or 78.0% to 86.0% by weight.

In some embodiments the glass is a borosilicate glass comprising $SiO_2$ in an amount of 70.0% to 90.0% by weight, 72.0% to 89.0% by weight, 74.0% to 88.0% by weight, 76.0% to 87.0% by weight, or 78.0% to 86.0% by weight.

In some embodiments the glass comprises one or more or all of the following constituents in percent by weight: 70.0% to 90.0% of $SiO_2$, 0.0% to 25.0% of $B_2O_3$, 0.0% to 10.0% of $Al_2O_3$, 0.0% to 10.0% of one or more alkali earth metal oxides, 0.0% to 7.0% of one or more alkali metal oxides.

In some embodiments the glass comprises one or more or all of the following constituents in percent by weight: 75.0% to 87.0% of $SiO_2$, 8.0% to 22.0% of $B_2O_3$, 1.0% to 7.0% of $Al_2O_3$, 0.25% to 5.0% of one or more alkali earth metal oxides, 0.0% to 5.0% of one or more alkali metal oxides.

In the context of the present invention, alkali metal oxides are meant to include specifically $Li_2O$, $Na_2O$ and $K_2O$, and alkali earth metal oxides are meant to include specifically MgO, CaO, BaO, and SrO.

In some embodiments, the glass comprises 0.0% to 10.0% of one or more alkali earth metal oxides, in percent by weight, such as 1.0% to 9.0%, 2.0% to 8.0%, 3.0% to 7.0%, or 4.0% to 6.0%.

In some embodiments, the glass comprises 0.0% to 7.0% of one or more alkali metal oxides, in percent by weight, such as 0.5% to 6.5%, 1.0% to 6.0%, 1.5% to 5.5%, or 2.0% to 5.0%. In some embodiments, the glass comprises 0.0% to 5.0% of one or more alkali metal oxides, in percent by weight, such as 0.1% to 4.5%, 0.2% to 4.0%, 0.3% to 3.5%, or 0.4% to 3.0%. In some embodiments, the glass comprises 0.0% or more of one or more alkali metal oxides, in percent by weight, 0.1% or more, 0.2% or more, 0.3% or more, or 0.4% or more. In some embodiments, the glass comprises 5.0% or less of one or more alkali metal oxides, in percent by weight, 4.5% or less, 4.0% or less, 3.5% or less, or 3.0% or less.

In some embodiments, the glass comprises in percent by weight:

| | |
|---|---|
| $SiO_2$ | 70.0% to 90.0% |
| $B_2O_3$ | >0.0% to 25.0% |
| $Al_2O_3$ | >0.0% to 10.0% |
| BaO | 0.0% to 5.0% |
| CaO | 0.0% to 3.0% |
| $K_2O$ | 0.0% to 5.0% |
| $Na_2O$ | 0.0% to 5.0% |
| $Li_2O$ | 0.0% to 1.0% |

In some embodiments the glass comprises $B_2O_3$ in an amount of 1.0% or more by weight, 2.0% or more by weight, 4.0% or more by weight, 6.0% or more by weight, or 8.0% or more by weight. In some embodiments the glass comprises $B_2O_3$ in an amount of 25.0% or less by weight, 22.0% or less by weight, 20.0% or less by weight, 180.0% or less by weight, 15.0% or less by weight, 12.0% or less by weight. In some embodiments the glass comprises $B_2O_3$ in an amount of 1.0% to 25.0% by weight, 2.0% to 22.0% by weight, 4.0% to 20.0% by weight, 6.0% to 18.0% by weight, or 8.0% to 15.0% by weight.

In some embodiments the glass comprises $Al_2O_3$ in an amount of 1.0% or more by weight, 2.0% or more by weight, 3.0% or more by weight, or 4.0% or more by weight. In some embodiments the glass comprises $Al_2O_3$ in an amount of 10.0% or less by weight, 9.0% or less by weight, 8.0% or less by weight, 7.0% or less by weight, or 6.0% or less by weight. In some embodiments the glass comprises $Al_2O_3$ in an amount of 0.0% to 10.0% by weight, 1.0% to 9.0% by weight, 2.0% to 8.0% by weight, 3.0% to 7.0% by weight, or 4.0% to 6.0% by weight.

In some embodiments, the glass comprises 0.0% to 5.0% of BaO, in percent by weight, such as 0.5% to 4.5%, 1.0% to 4.0%, 1.5% to 3.5%, or 2.0% to 3.0%. In some embodiments, the glass comprises, in percent by weight, 0.0% BaO or more, 0.5% or more, 1.0% or more, 1.5% or more, or 2.0% or more. In some embodiments, the glass comprises 5.0% of BaO or less, in percent by weight, 4.5% or less, 4.0% or less, 3.5% or less, or 3.0% or less.

In some embodiments, the glass comprises 0.0% to 3.0% of CaO, in percent by weight, such as 0.2% to 2.8%, 0.4% to 2.6%, 0.6% to 2.4%, 0.8% to 2.2%, or 1.0% to 2.0%. In some embodiments, the glass comprises 0.0% CaO or more, in percent by weight, 0.2% or more, 0.4% or more, 0.6% or more, 0.8% or more, or 1.0% or more. In some embodiments, the glass comprises 3.0% of CaO or less, in percent by weight, 2.8% or less, 2.6% or less, 2.4% or less, 2.2% or less, or 2.0% or less.

In some embodiments, the glass comprises 0.0% to 5.0% of $K_2O$, in percent by weight, such as 0.5% to 4.5%, 1.0% to 4.0%, 1.5% to 3.5%, or 2.0% to 3.0%. In some embodiments, the glass comprises 0.0% of $K_2O$ or more, in percent by weight, 0.5% or more, 1.0% or more, 1.5% or more, or 2.0% or more. In some embodiments, the glass comprises 5.0% of $K_2O$ or less, in percent by weight, 4.5% or less, 4.0% or less, 3.5% or less, or 3.0% or less.

In some embodiments, the glass comprises 0.0% to 5.0% of $Na_2O$, in percent by weight, such as 0.5% to 4.5%, 1.0% to 4.0%, 1.5% to 3.5%, or 2.0% to 3.0%. In some embodiments, the glass comprises 0.0% to 3.0% of $Na_2O$, in percent by weight, such as 0.1% to 2.5%, 0.2% to 2.0%, 0.3% to 1.5%, or 0.4% to 1.0%. In some embodiments, the glass comprises 0.0% of $Na_2O$ or more, in percent by weight, 0.1% or more, 0.2% or more, 0.3% or more, or 0.4% or more. In some embodiments, the glass comprises 3.0% of $Na_2O$ or less, in percent by weight, 2.5% or less, 2.0% or less, 1.5% or less, or 1.0% or less.

In some embodiments, the glass comprises 0.0% to 1.0% of $Li_2O$, in percent by weight, such as 0.1% to 0.9%, 0.2% to 0.8%, 0.3% to 0.7%, or 0.4% to 0.6%. In some embodiments, the glass comprises 0.0% of $Li_2O$ or more, in percent by weight, 0.1% or more, 0.2% or more, 0.3% or more, or 0.4% or more. In some embodiments, the glass comprises 1.0% of $Li_2O$ or less, in percent by weight, 0.9% or less, 0.8% or less, 0.7% or less, or 0.6% or less.

In some embodiments, the glass comprises 1000 ppm (by weight) $Fe_2O_3$ or less, 500 ppm (by weight) $Fe_2O_3$ or less, 200 ppm (by weight) $Fe_2O_3$ or less, 100 ppm (by weight) $Fe_2O_3$ or less, 50 ppm (by weight) $Fe_2O_3$ or less, or 20 ppm (by weight) $Fe_2O_3$ or less. In some embodiments, the glass comprises 1 ppm (by weight) $Fe_2O_3$ or more, 2 ppm (by weight) $Fe_2O_3$ or more, 3 ppm (by weight) $Fe_2O_3$ or more, 5 ppm (by weight) $Fe_2O_3$ or more, 7 ppm (by weight) $Fe_2O_3$ or more, or 10 ppm (by weight) $Fe_2O_3$ or more. In some embodiments, the glass comprises 1 to 1000 ppm (by weight) $Fe_2O_3$, 2 to 500 ppm (by weight) $Fe_2O_3$, 3 to 200 ppm (by weight) $Fe_2O_3$, 5 to 100 ppm (by weight) $Fe_2O_3$, 7 to 50 ppm (by weight) $Fe_2O_3$, or 10 to 20 ppm (by weight) $Fe_2O_3$.

In some embodiments, the glass comprises in percent by weight:

| | |
|---|---|
| $SiO_2$ | 75.0% to 87.0% |
| $B_2O_3$ | 8.0% to 22.0% |
| $Al_2O_3$ | 1.0% to 7.0% |
| BaO | 0.0% to 3.0% |
| CaO | 0.0% to 2.0% |
| $K_2O$ | 0.0% to 3.0% |
| $Na_2O$ | 0.0% to 3.0% |
| $Li_2O$ | 0.0% to 1.0% |

In some embodiments, the glass comprises in percent by weight:

| | |
|---|---|
| $SiO_2$ | 77.0% to 87.0% |
| $B_2O_3$ | 8.0% to 13.0% |
| $Al_2O_3$ | 3.0% to 7.0% |
| BaO | 0.0% to 3.0% |
| CaO | 0.0% to 2.0% |
| $K_2O$ | 0.0% to 3.0% |
| $Na_2O$ | 0.0% to 1.0% |
| $Li_2O$ | 0.0% to 1.0% |

In some embodiments, the glass comprises in percent by weight:

| | |
|---|---|
| $SiO_2$ | 77.0% to 87.0% |
| $B_2O_3$ | 8.0% to 13.0% |
| $Al_2O_3$ | 3.0% to 7.0% |
| BaO | 0.0% to 3.0% |
| CaO | 0.0% to 2.0% |
| $K_2O$ | 0.0% to 3.0% |
| $Na_2O$ | 0.0% to 0.1% |
| $Li_2O$ | 0.0% to 1.0% |

In some embodiments, the glass comprises in percent by weight:

| | |
|---|---|
| $SiO_2$ | 80.0% to 87.0% |
| $B_2O_3$ | 8.0% to 13.0% |
| $Al_2O_3$ | 3.0% to 7.0% |
| BaO | 0.0% to 2.0% |
| CaO | 0.0% to 1.0% |
| $K_2O$ | 0.0% to 1.0% |
| $Na_2O$ | 0.0% to 0.1% |
| $Li_2O$ | 0.0% to 0.1% |

In some embodiments the glass is free of one or more or all of lithium, magnesium, potassium, calcium, sodium, lead, arsenic, antimony.

If this description refers to a glass which is free of a component or does not contain a certain component, or includes the hypothetical case of 0% by weight of that component, it is to be understood that this component may at most be present as an impurity. This means that it is not added in significant quantities and that it is not added intentionally. The term "component" refers to the elemental species as such as well as any molecule containing the element. Non-essential amounts are to be understood as less than 100 ppm, optionally less than 50 ppm, and most optionally less than 10 ppm, based on weight with respect to all intentionally added components.

In some embodiments, the glass has one or more or all of the following properties:
- a coefficient of thermal expansion in the temperature range from 20° C. to 300° C. of 0.5 ppm/K or more,
- a water content of 100 mmol/l or less,
- a density of 2.30 g/cm³ or less,
- a strain point of 550° C. or more, and/or
- an electric volume resistivity $T_{k100}$ at 250° C. of at least $10^8$ Ωcm, optionally at least $10^{10}$ Ωcm, measured according to DIN 52326:1986-05.

In some embodiments the glass has a density of 2.30 g/cm³ or less, 2.25 g/cm³ or less, 2.20 g/cm³ or less, 2.15 g/cm³ or less, or 2.10 g/cm³ or less. In some embodiments the glass has a density of 1.85 g/cm³ or more, 1.90 g/cm³ or more, 1.95 g/cm³ or more, 2.00 g/cm³ or more, or 2.05 g/cm³ or more. In some embodiments the glass has a density of 1.85 g/cm3 to 2.30 g/cm³, 1.90 g/cm³ to 2.25 g/cm³, 1.95 g/cm³ to 2.20 g/cm³, 2.00 g/cm³ to 2.15 g/cm³, or 2.05 g/cm³ to 2.10 g/cm³.

In some embodiments the glass has a strain point of 550° C. or more, also known as T13.5 temperature, defined as the temperature at which the glass has a viscosity of $10^{13.5}$ dPa*s, 600° C. or more, or 650° C. or more. In some embodiments the glass has a strain point of 800° C. or less, 750° C. or less, or 700° C. or less. In some embodiments the glass has a strain point of 550° C. to 800° C., also known as T13.5 temperature, defined as the temperature at which the glass has a viscosity of $10^{13.5}$ dPa*s, 600° C. to 750° C., or 650° C. to 700° C.

In some embodiments the glass has an electric volume resistivity $T_{k100}$ at 250° C. of at least $10^8$ Ωcm, optionally at least $10^{10}$ Ωcm, measured according to DIN 52326:1986-05, and/or $T_{k100}$ at 250° C. of $10^{12}$ Ωcm or less, optionally $10^{11}$ Ωcm or less. In some embodiments the glass has an electric volume resistivity $T_{k100}$ at 250° C. of $10^8$ Ωcm to $10^{12}$ Ωcm, optionally $10^{10}$ Ωcm to $10^{11}$ Ωcm.

In some embodiments a glass has a coefficient of thermal expansion in the temperature range from 20° C. to 300° C. of 4.5 ppm/K or less, and a T4 temperature, defined as the temperature at which the glass has a viscosity of $10^4$ dPa*s, at 1500° C. or more, the glass having a water content of at least 35 mmol/l, optionally at least 45 mmol/l, more optionally at least 55 mmol/l.

In some embodiments a glass has a coefficient of thermal expansion in the temperature range from 20° C. to 300° C. of 0.4 ppm/K to 4.5 ppm/K, 0.5 ppm/K to 4.0 ppm/K, 0.6 ppm/K to 3.5 ppm/K, 0.7 ppm/K to 3.0 ppm/K, or 0.8 ppm/K to 2.5 ppm/K, and a T4 temperature, defined as the temperature at which the glass has a viscosity of $10^4$ dPa*s, at 1500° C. or more, the glass having a water content of at least 35 mmol/l, optionally at least 45 mmol/l, optionally at least 55 mmol/l.

In some embodiments a glass has a coefficient of thermal expansion in the temperature range from 20° C. to 300° C. of 4.5 ppm/K or less, and a T4 temperature, defined as the temperature at which the glass has a viscosity of $10^4$ dPa*s, of 1500° C. to 1900° C., 1550° C. to 1850° C., 1600° C. to 1800° C., or 1650° C. to 1750° C., the glass having a water content of at least 35 mmol/l, optionally at least 45 mmol/l, optionally at least 55 mmol/l.

In some embodiments a glass has a coefficient of thermal expansion in the temperature range from 20° C. to 300° C. of 4.5 ppm/K or less, and a T4 temperature, defined as the temperature at which the glass has a viscosity of $10^4$ dPa*s, at 1500° C. or more, the glass having a water content of 35 to 250 mmol/l, 40 to 200 mmol/l, 45 to 150 mmol/l, 50 to 125 mmol/l, or 55 to 100 mmol/l.

Glass Article

In some embodiments a glass article comprises or consists of a glass provided according to the invention, being in the shape of a rod, a tube, an ingot, a disc, a sheet or a block.

In some embodiments, the glass article has a length and a width, wherein a relative water content deviation is at most 10% and/or at most 5 mmol/l, the relative water content deviation being defined as the difference between the maximum and minimum water contents measured in the article by IR spectrometry.

In some embodiments, the glass article has a length and a width, wherein a relative water content deviation is at most 10% and/or at most 5 mmol/l, the relative water content deviation being defined as the difference between the maximum and minimum water contents measured in the article by IR spectrometry at the absorption maximum at about 2700 nm, wherein the absorption maximum is optionally determined on an IR absorption spectrum in the wavelength range from 2500 to 6500 nm.

In some embodiments, the glass article may have a cylinder shape or a bar shape, the glass article having a length and a width. In some embodiments, the glass article has a length of 5 cm or more, 10 cm or more, 15 cm or more, or 20 cm or more, and/or a length of 200 cm or less, 150 cm or less, 100 cm or less, or 50 cm or less. In some embodiments, the glass article has a length of 5 cm to 200 cm, 10 cm to 150 cm, 15 cm to 100 cm, or 20 cm to 50 cm. In some embodiments, the glass article has a width of 1.0 cm or more, 1.5 cm or more, 2.0 cm or more, 2.5 cm or more, and/or a width of 20 cm or less, 15 cm or less, 10 cm or less, or 5 cm or less. In some embodiments, the glass article has a width of 1.0 cm to 20 cm, 1.5 cm to 15 cm, 2.0 cm to 10 cm, or 2.5 cm to 5 cm.

In some embodiments, the glass article may have a cylinder shape, wherein the glass article has a length of 5 cm to 200 cm and a width of 1.0 cm to 20 cm, a length of 10 cm to 150 cm and a width of 1.5 cm to 15 cm, a length of 15 cm to 100 cm and a width of 2.0 cm to 10 cm, or a length of 20 cm to 50 cm and a width of 2.5 cm to 5 cm.

In some embodiments, the glass article may have a bar shape, wherein the glass article has a length of 5 cm to 200 cm and a width of 1.0 cm to 20 cm, a length of 10 cm to 150 cm and a width of 1.5 cm to 15 cm, a length of 15 cm to 100 cm and a width of 2.0 cm to 10 cm, or a length of 20 cm to 50 cm and a width of 2.5 cm to 5 cm.

The water content may be determined by IR spectrometry based on the OH-stretching vibration at about 2700 nm, for example with a commercially available Nicolet FTIR spectrometer. The absorption in the wavelength range from 2500 to 6500 nm may be measured first and the absorption maximum may then be determined at about (or in the range of) 2700 nm. The absorption coefficient α is calculated based on the sample thickness d, the internal transmittance $T_i$ and the reflection factor P using the following equation:

$$\alpha = 1/d * lg(1/T_i)[\text{cm}^{-1}],$$

wherein $T_i = T/P$, wherein T denotes the transmission. The water content is then obtained by $$c = \alpha/\varepsilon,$$

wherein ε denotes the extinction coefficient. For a water content in the range of 25 to 80 mmol/l ε=110 l mol$^{-1}$ cm$^{-1}$ (H. Frank and H. Scholze, "Glastechnische Berichte", vol. 36, issue 9, page 350).

In some embodiments, the glass article has a relative water content deviation of at most 10%, at most 8%, at most 6%, at most 4%, or at most 2% and/or at most 5 mmol/l, at most 4 mmol/l, at most 3 mmol/l, at most 2 mmol/l, or at most 1 mmol/l. In some embodiments, the glass article has a relative water content deviation of at least 0.2%, at least 0.4%, at least 0.6%, at least 0.8%, or at least 1.0% and/or at least 0.1 mmol/l, at least 0.2 mmol/l, at least 0.3 mmol/l, at least 0.4 mmol/l, or at least 0.5 mmol/l.

In some embodiments a set of glass articles is provided, wherein each of the articles has a water content of at least 35 mmol/l, at least 40 mmol/l, at least 45 mmol/l, at least 50 mmol/l, or at least 55 mmol/l and/or a water content of 250 mmol/l or less, 200 mmol/l or less, 150 mmol/l or less, 125 mmol/l or less, or 100 mmol/l or less. Accordingly, in some embodiments, a set of glass articles is provided, wherein each of the articles has a water content of 35 to 250 mmol/l, 40 to 200 mmol/l, 45 to 150 mmol/l, 50 to 125 mmol/l, or 55 to 100 mmol/l.

In some embodiments a set of glass articles is provided, wherein a uniformity of water contents within the set is defined by a difference of the maximum water content measured in any of the glass articles within the set and the minimum water content measured in any of the glass articles within the set, wherein this difference is not more than 5 mmol/l. In some embodiments the uniformity of water contents within the set is measured by IR spectrometry at the absorption maximum at about 2700 nm, wherein the absorption maximum is optionally determined on an IR absorption spectrum in the wavelength range from 2500 to 6500 nm.

In some embodiments, a set of glass articles is provided, wherein a uniformity of water contents within the set is defined by a difference of the maximum water content measured in any of the glass articles within the set and the minimum water content measured in any of the glass articles within the set, wherein this difference is not more than 5 mmol/l, not more than 4 mmol/l, not more than 3 mmol/l, not more than 2 mmol/l, or not more than 1 mmol/l and/or wherein this difference is 0.1 mmol/l or more, 0.2 mmol/l or more, 0.3 mmol/l or more, 0.4 mmol/l or more, or 0.5 mmol/l or more. Accordingly, in some embodiments a set of glass articles is provided, wherein a uniformity of water contents within the set is defined by a difference of the maximum water content measured in any of the glass articles within the set and the minimum water content measured in any of the glass articles within the set, wherein this difference is from 0.1 mmol/l to 5 mmol/l, 0.2 mmol/l to 4 mmol/l, 0.3 mmol/l to 3 mmol/l, 0.4 mmol/l to 2 mmol/l, or 0.5 mmol/l to 1 mmol/l.

For the end user, e.g. a manufacturer of flash lamps, it may be advantageous to work from a set of glass articles having a uniformity of water contents within the above metes and bounds. This has numerous benefits for the reliability and reproducibility of the manufacturing process and the manufactured products.

In some embodiments a set of glass articles is provided, wherein the number of glass articles within the set is at least 10, at least 50, at least 100, or at least 200, and/or at most 1000, at most 500, or at most 300 glass articles.

Method

In some embodiments a method of making a glass is provided. The method includes the following steps:
preparing a glass melt of glass raw materials,
adjusting a water content of the glass melt,
cooling and/or forming the glass melt to obtain a glass article, wherein the glass has a coefficient of thermal expansion in the temperature range from 20° C. to 300° C. of 4.5 ppm/K or less, and a T4 temperature, defined as the temperature at which the glass has a viscosity of $10^4$ dPa*s, at 1500° C. or more, wherein the glass has a water content of at least 35 mmol/l, optionally at least 45 mmol/l, optionally at least 55 mmol/l, and/or wherein the glass has a reboil propensity score of less than 10 measured in a reboil propensity test.

In some embodiments, preparing a glass melt of glass raw materials comprises providing a batch or an admixture of oxides, wherein the oxides may be selected from the list of $SiO_2$, $B_2O_3$, $Al_2O_3$, one or more alkali earth metal oxides, and one or more alkali metal oxides, and heating the batch or the admixture of oxides until melting.

In some embodiments, cooling the glass melt to obtain a glass article is performed in a temperature range of 50° C. below the glass transformation temperature $T_g$ and 150° C. above the glass transformation temperature $T_g$, at an average cooling rate of at least 1 K/min, 2 K/min, 5 K/min, 10 K/min, and/or an average cooling rate of 100 K/min or less, 75 K/min or less, 50 K/min or less, or 25 K/min or less. In some embodiments, cooling the glass melt to obtain a glass article is performed in a temperature range of 50° C. below the glass transformation temperature $T_g$ and 150° C. above the glass transformation temperature $T_g$, at an average cooling rate of 1 K/min to 100 K/min, 2 K/min to 75 K/min, 5 K/min to 50 K/min, or 10 K/min to 25 K/min.

In some embodiments a method is provided, wherein adjusting and/or controlling a water content of the glass melt comprises one or more of the following steps
keeping the glass melt at elevated temperature for a time sufficient to obtain the water content,
selecting an $SiO_2$ content in the glass such that the water content is obtained,
controlling a water vapor concentration in the atmosphere above the glass melt such that the water content is obtained,
controlling a glass melt temperature such that the water content is obtained.

In some embodiments, two or more of the above-mentioned steps are performed to adjust and/or control the water content. In some embodiments of the method, adjusting and/or controlling a water content of the glass melt comprises keeping the glass melt at elevated temperature for a time sufficient to obtain the water content. In some embodiments, adjusting a water content of the glass melt comprises keeping the glass melt at a temperature of at least 1600° C. for at least 1 hour, a temperature of at least 1700° C. for at least 1 hour, a temperature of at least 1800° C. for at least 1 hour, a temperature of at least 1900° C. for at least 1 hour, a temperature of at least 1600° C. for at least 2 hours, a temperature of at least 1700° C. for at least 2 hours, a temperature of at least 1800° C. for at least 2 hours, a temperature of at least 1900° C. for at least 2 hours, a temperature of at least 1600° C. for at least 5 hours, a temperature of at least 1700° C. for at least 5 hours, a temperature of at least 1800° C. for at least 5 hours, a temperature of at least 1900° C. for at least 5 hours, a temperature of at least 1600° C. for at least 10 hours, a temperature of at least 1700° C. for at least 10 hours, a temperature of at least 1800° C. for at least 10 hours, or a temperature of at least 1900° C. for at least 10 hours.

In some embodiments, adjusting a water content of the glass melt comprises selecting a $SiO_2$ content in the glass such that the water content is obtained. In some embodiments, adjusting a water content of the glass melt comprises selecting a $SiO_2$ content in an amount of 70.0% to 90.0% by weight, 72.0% to 89.0% by weight, 74.0% to 88.0% by weight, 76.0% to 87.0% by weight, or 78.0% to 86.0% by weight, based on the gross weight of the glass raw materials.

In some embodiments, adjusting a water content of the glass melt comprises controlling a water vapor concentration in the atmosphere above the glass melt such that the water content is obtained. In some embodiments, the water vapor concentration in the atmosphere above the glass melt is at least 0.02 MPa partial pressure exerted by the water vapor, at least 0.05 MPa, at least 0.1 MPa, at least 0.25 MPa, at least 0.5 MPa, at least 1.0 MPa. In some embodiments, the water vapor concentration in the atmosphere above the glass melt is 10 MPa partial pressure exerted by the water vapor or less.

A sufficient water vapor concentration in the atmosphere above the glass melt may help establish a desired water content in the glass, e.g. at least 35 mmol/l, at least 40 mmol/l, at least 45 mmol/l, at least 50 mmol/l, or at least 55 mmol/l. The water vapor concentration may be established by a well-defined excess pressure in the atmosphere above the glass melt, as well as a well-defined temperature. The excess pressure in the atmosphere above the glass melt may be adjusted, for example, in a suitable oven by partially or fully closing nozzles and/or openings in the oven. A well-defined excess pressure in the atmosphere above the glass melt may, for example, be established by burning natural or synthetic gas and optionally by adjusting the extent of purging of exhaust gas.

In some embodiments, adjusting a water content of the glass melt comprises controlling a glass melt temperature such that the water content is obtained. In some embodiments, adjusting a water content of the glass melt comprises establishing a glass melt temperature of at least 1600° C., at least 1700° C., at least 1800° C., or at least 1900° C.

The glass melt temperature has several influences as part of the method. Generally, the water solubility in the glass melt is enhanced upon temperature elevation. Further, at elevated temperatures the viscosity of the glass melt is reduced which accelerates diffusion and convection processes and in turn influences the solubility and the solution process of water in the glass melt.

Use

In some embodiments a use of a glass provided according to the invention is provided for joining a metal article to a glass element.

In some embodiments, a use of a glass provided according to the invention is provided, wherein the glass is used as a glass sealing material to fuse a metal electrode, e.g. a tungsten or molybdenum electrode, with a glass tube, e.g. a quartz glass tube.

Flash Lamp

In some embodiments a flash lamp is provided that comprises a glass provided according to the invention.

In some embodiments, a flash lamp is provided comprising a metal electrode and a tube, wherein the tube optionally comprises or consists of glass, such as quartz glass, further comprising a sealing glass being a glass provided according to the invention.

In some embodiments, a flash lamp is provided comprising a metal electrode and a tube, wherein the metal electrode and the tube are joined by a sealing glass being a glass provided according to the invention. In some embodiments, a flash lamp is provided comprising a tungsten electrode or a molybdenum electrode, and a quartz glass tube, wherein the tungsten electrode or the molybdenum electrode, and the quartz glass tube are joined by a sealing glass being a glass provided according to the invention.

It may be advantageous to use a glass provided according to the invention as a sealing glass because it provides for an excellent sealing junction, i.e. the fuse, between the electrode and the glass tube, even at extreme and rapid temperature changes. Advantageously, the stability and the lifespan of the manufactured flash lamps which undergo such extreme and rapid temperature changes during their lifecycle is thereby increased, i.e. when in use.

In some embodiments, the metal electrode comprises or consists of a metal selected from the list of e.g. tungsten and molybdenum.

Examples

Glass Compositions

The following glass compositions 1 to 5 are exemplary and are further characterized by the coefficient of thermal expansion (CTE) and the T4 temperature.

|  | Composition (wt. %) | | | | |
| --- | --- | --- | --- | --- | --- |
|  | 1 | 2 | 3 | 4 | 5 |
| $SiO_2$ | 85.0 | 82.0 | 81.0 | 79.0 | 78.5 |
| $B_2O_3$ | 10.0 | 11.0 | 11.0 | 11.0 | 10.5 |
| $Al_2O_3$ | 4.5 | 5.0 | 5.0 | 5.0 | 5.0 |
| BaO | 0.5 | 1.5 | 2.0 | 2.0 | 2.0 |
| CaO | — | 0.5 | 1.0 | 1.0 | 1.0 |
| $K_2O$ | — | — | <0.5 | 2.0 | 3.0 |
| $Na_2O$ |  |  |  |  |  |
| $Li_2O$ |  |  |  |  |  |
| $Fe_2O_3$ | <0.1 | <0.1 | <0.1 | <0.1 | <0.1 |
| CTE (ppm/K) | 1.25 | 1.60 | 1.90 | 2.65 | 3.05 |
| T4 (° C.) | 1710 | 1700 | 1680 | 1605 | 1570 |

Reboil Propensity Test Results

The reboil propensity test has been carried out as described in the detailed description. The glasses have been qualified into categories from 5 (poor), 4 (acceptable), 3 (fair/moderate), 2 (good) and 1 (excellent). All tested glasses have a T4 temperature of at least 1500° C.

The reboil propensity score has been quantified as number of bubbles with an equivalent spherical diameter of at least 0.5 mm per 125 $mm^3$ in any part of the formed spiral. For each glass rod formed into a spiral, the reboil propensity score has been calculated as average value obtained from the volume elements of 125 $mm^3$.

| $H_2O$ [mmol/l] | Classification | CTE [ppm/k] | Reboil propensity score |
| --- | --- | --- | --- |
| 46 | 4 | 1.30 | 8.6 |
| 50 | 3 | 1.24 | 2.7 |
| 57 | 2 | 1.25 | 1.3 |
| 62 | 1 | 1.27 | 0.1 |

Figure 2A:
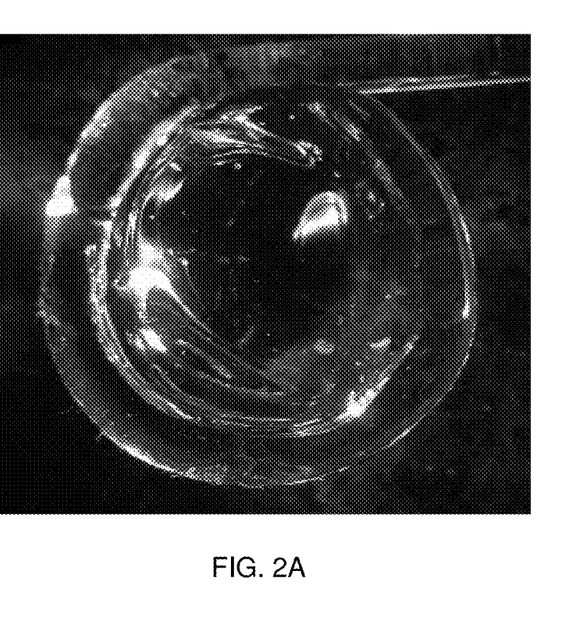
FIG. 2A illustrates a glass rod subjected to the reboil propensity test with a formed spiral which has passed the test and obtained the classification '1'.
Figure 2B:
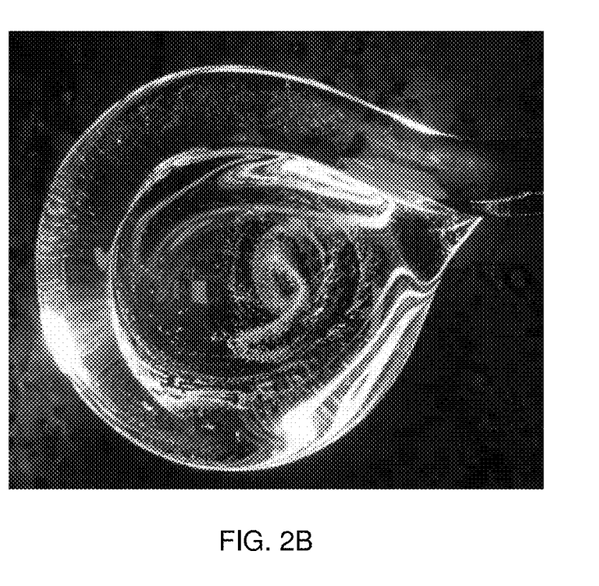
FIG. 2B illustrates a glass rod subjected to the reboil propensity test with a formed spiral which has passed the test and obtained the classification '2'.
Figure 2C:
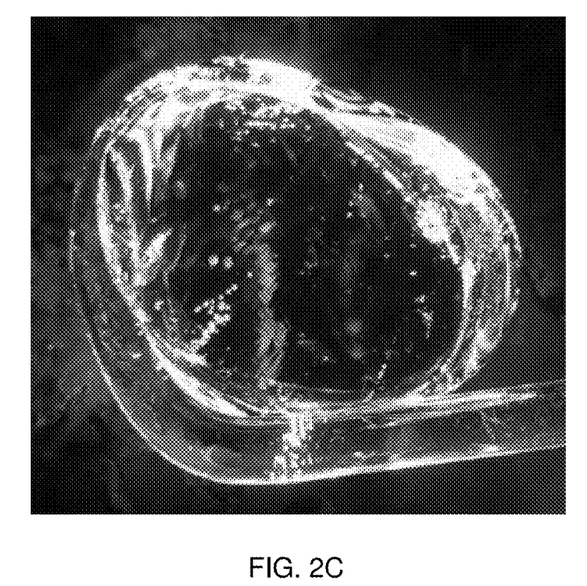
FIG. 2C illustrates a glass rod subjected to the reboil propensity test with a formed spiral which has passed the test and obtained the classification '3'.
Figure 2D:
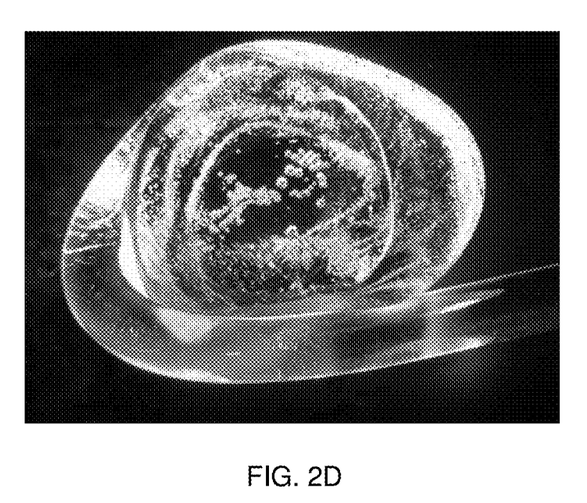
FIG. 2D illustrates a glass rod subjected to the reboil propensity test with a formed spiral which has passed the test and obtained the classification '4'.
Figure 2E:
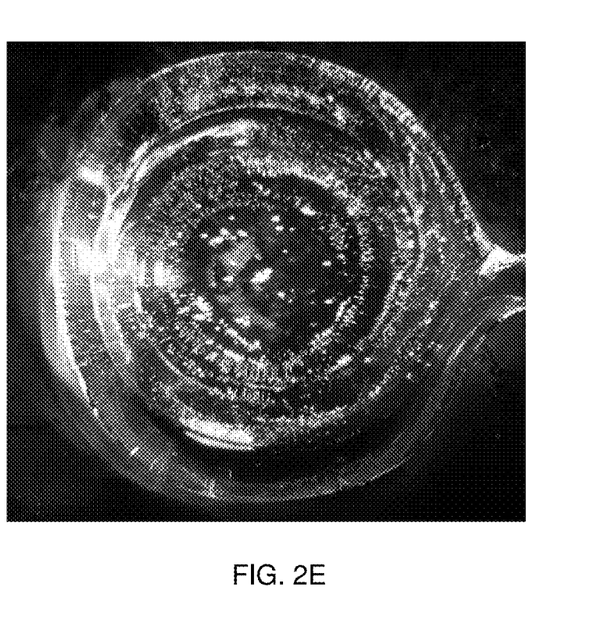
FIG. 2E illustrates a glass rod subjected to the reboil propensity test with a formed spiral which has not passed the test and obtained the classification '5'.

FIG. 1 illustrates formed spirals in the reboil propensity test, obtained at temperatures of 1650° C., 1580° C. and 1420° C. (from left to right). FIG. 2A illustrates a glass rod subjected to the reboil propensity test with a formed spiral which has passed the test and obtained the classification '1' (excellent). FIG. 2B illustrates a glass rod subjected to the reboil propensity test with a formed spiral which has passed the test and obtained the classification '2' (good). FIG. 2C illustrates a glass rod subjected to the reboil propensity test with a formed spiral which has passed the test and obtained the classification '3' (fair/moderate). FIG. 2D illustrates a glass rod subjected to the reboil propensity test with a formed spiral which has passed the test and obtained the classification '4' (acceptable. FIG. 2E illustrates a glass rod subjected to the reboil propensity test with a formed spiral which has not passed the test and obtained the classification '5' (poor).

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A glass having a coefficient of thermal expansion in a temperature range from 20° C. to 300° C. of 4.5 ppm/K or less, and a T4 temperature, defined as the temperature at which the glass has a viscosity of $10^4$ dPa*s, at 1500° C. or more, and having a reboil propensity score of less than 10 measured in a reboil propensity test, wherein the reboil propensity score is determined as a number of bubbles per glass rod formed from the glass after the reboil propensity test.

2. The glass of claim 1, having a water content of at least 35 mmol/l.

3. The glass of claim 2, wherein the water content is at least 45 mmol/l.

4. The glass of claim 1, wherein the glass comprises at least one of the following constituents in percent by weight:
75.0% to 87.0% of $SiO_2$;
8.0% to 22.0% of $B_2O_3$;
1.0% to 7.0% of $Al_2O_3$;
0.25% to 5.0% of one or more alkali earth metal oxides; or
0.0% to 5.0% of one or more alkali metal oxides.

5. The glass of claim 4, wherein the glass comprises all of the constituents.

6. The glass of claim 1, comprising in percent by weight:
$SiO_2$ 77.0% to 87.0%;
$B_2O_3$ 8.0% to 13.0%;
$Al_2O_3$ 3.0% to 7.0%;
BaO 0.0% to 3.0%;
CaO 0.0% to 2.0%;
$K_2O$ 0.0% to 3.0%;
$Na_2O$ 0.0% to 1.0%; and
$Li_2O$ 0.0% to 1.0%.

7. The glass of claim 1, wherein the glass is free of at least one of lithium, magnesium, potassium, calcium, sodium, lead, arsenic, or antimony.

8. The glass of claim 1, wherein at least one of the following criteria is satisfied:
the coefficient of thermal expansion in the temperature range from 20° C. to 300° C. is 0.5 ppm/K or more;
a water content is 100 mmol/l or less;
the glass has a density of 2.30 g/cm³ or less;
the glass has a strain point at 550° C. or more; or
the glass has an electric volume resistivity $T_{k100}$ at 250° C. of at least $10^8$ Ωcm measured according to DIN 52326:1986-05.

9. At least one glass article, the at least one glass article comprising:
a glass having a coefficient of thermal expansion in a temperature range from 20° C. to 300° C. of 4.5 ppm/K or less, and a T4 temperature, defined as the temperature at which the glass has a viscosity of $10^4$ dPa*s, at 1500° C. or more, the glass having a water content of at least 35 mmol/l.

10. The at least one glass article of claim 9, wherein the at least one glass article is in the shape of a rod, a tube, an ingot, a disc, a sheet or a block.

11. The at least one glass article of claim 9, wherein a relative water content deviation is at least one of at most 10% or at most 5 mmol/l, the relative water content deviation being defined as a difference between a maximum water content and a minimum water content measured in the at least one glass article by IR spectrometry.

12. The at least one glass article of claim 9, wherein the at least one glass article comprises a set of glass articles each comprising the glass.

13. The set of glass articles of claim 12, wherein a uniformity of water contents within the set of glass articles is defined by a difference of a maximum water content measured in any of the glass articles within the set and a minimum water content measured in any of the glass articles within the set, wherein this difference is not more than 5 mmol/l.

14. The set of glass articles of claim 12, wherein the number of glass articles within the set is at least one of at least 10 glass articles or at most 1000 glass articles.

15. A flash lamp, comprising:
a glass having a coefficient of thermal expansion in a temperature range from 20° C. to 300° C. of 4.5 ppm/K or less, and a T4 temperature, defined as the temperature at which the glass has a viscosity of $10^4$ dPa*s, at 1500° C. or more, and having a reboil propensity score of less than 10 measured in a reboil propensity test, wherein the reboil propensity score is determined as a number of bubbles per glass rod formed from the glass.

16. The flash lamp of claim 15, further comprising a metal electrode and a tube, wherein the metal electrode and the tube are joined together by the glass.

17. The flash lamp of claim 16, wherein the tube comprises quartz glass.

* * * * *

UNITED STATES PATENT AND TRADEMARK OFFICE
CERTIFICATE OF CORRECTION

PATENT NO. : 11,958,771 B1
APPLICATION NO. : 17/968486
DATED : April 16, 2024
INVENTOR(S) : Andre Petershans et al.

Page 1 of 1

It is certified that error appears in the above-identified patent and that said Letters Patent is hereby corrected as shown below:

In the Specification

Column 9
At Line 1, please delete "180.0%", and substitute therefore --18.0%--.

Signed and Sealed this
Twenty-third Day of December, 2025

John A. Squires
*Director of the United States Patent and Trademark Office*